United States Patent

Jahkonen et al.

(10) Patent No.: US 6,515,444 B1
(45) Date of Patent: Feb. 4, 2003

(54) METHOD FOR CONTROLLING A CURRENT-REGULATED MOTOR

(75) Inventors: Pekka Jahkonen, Hyvinkaa (FI); Jyrki Laaksonheimo, Hyvinkaa (FI); Ekso Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/786,202
(22) PCT Filed: Sep. 2, 1999
(86) PCT No.: PCT/FI99/00715
§ 371 (c)(1),
(2), (4) Date: Mar. 27, 2001
(87) PCT Pub. No.: WO00/14864
PCT Pub. Date: Mar. 16, 2000

(30) Foreign Application Priority Data

Sep. 4, 1998 (FI) .................................................. 981905

(51) Int. Cl.⁷ .............................................. H02P 7/100
(52) U.S. Cl. ........................ 318/629; 318/432; 318/254
(58) Field of Search ................ 187/292, 293, 187/296; 318/629, 432, 254

(56) References Cited

U.S. PATENT DOCUMENTS

| | | | | |
|---|---|---|---|---|
| 3,919,609 A | * | 11/1975 | Klautschek et al. | 318/227 |
| 4,066,938 A | * | 1/1978 | Turnbull | 318/227 |
| 4,137,489 A | * | 1/1979 | Lipo | 318/798 |
| 5,235,503 A | | 8/1993 | Stemmler et al. | 363/37 |
| 5,274,313 A | * | 12/1993 | Amrhein | 318/629 |
| 5,285,144 A | * | 2/1994 | Hsu et al. | 318/807 |
| 5,359,269 A | * | 10/1994 | Wedeen et al. | 318/432 |
| 5,485,071 A | * | 1/1996 | Bi et al. | 318/700 |
| 5,886,493 A | * | 3/1999 | Ueda et al. | 318/611 |
| 6,229,277 B1 | * | 5/2001 | Hakala et al. | 318/629 |

FOREIGN PATENT DOCUMENTS

| | | |
|---|---|---|
| JP | 01321893 | 12/1989 |
| JP | 02188178 | 7/1990 |
| WO | WO 9826643 | 6/1998 |

* cited by examiner

*Primary Examiner*—Jonathan Salata
*Assistant Examiner*—Rina I. Duda
(74) *Attorney, Agent, or Firm*—Birch, Stewart, Kolasch & Birch, LLP

(57) ABSTRACT

The invention relates to a method for controlling an alternating-current motor fed from a current-controlled alternating-current source, in which method the effect of harmonic moments generated in the motor is compensated. According to the invention, the torque of the motor is regulated by means of a current reference and that the current reference is corrected to compensate the harmonic moment.

8 Claims, 2 Drawing Sheets

METHOD FOR CONTROLLING A CURRENT-REGULATED MOTOR

This application is the national phase under 35 U.S.C. §371 of PCT International Application No. PCT/FI99/00715 which has an International filing date of Sep. 2, 1999, which designated the United States of America.

The present invention relates to a method of controlling a permanent magnet alternating current motor.

The torque of an alternating-current motor is generated by means of an armature circuit, normally the stator, a supply voltage and an excitation circuit, normally the rotor. The supply voltage is fed into the stator winding, which is fitted in stator slots. Excitation is developed by means of permanent magnets or an excitation winding fitted in the rotor. The steadiness of the torque depends on how closely the field developed in the air gap of the motor approaches the sinusoidal form. A curve form differing from the sinusoidal form produces torque variations at a frequency determined by the harmonic components contained in it, giving rise to mechanical vibration and noise.

In addition to the supply voltage, the form of the air gap field depends on the form of the field generated by the excitation, among other things. Moreover, in motors having a small number of slots per phase and pole, a notable problem is the so-called slot-harmonic field generated by the current flowing in each slot. For instance, in a three-phase motor with one slot per phase, a six-fold motor supply frequency is problematic.

Public patent application WO 98/26643 presents a solution in which the moment resulting from the harmonic voltage is eliminated by adding to the motor supply voltage a harmonic that will compensate the disturbing moment produced by the slot harmonic. In this solution, the harmonic voltage added to the supply voltage produces a moment that is equal to the disturbing moment ripple but in opposite phase. In practice, however, as regards motor regulation, the solution described in the publication is difficult to implement and the apparatus comprises a large number of components.

The object of the present invention is to achieve a solution that allows simple regulation without superfluous voltage conversions while at the same time minimising the required measuring and control circuits.

According to the invention, harmonic moments of the motor are effectively eliminated by adding to the current reference an auxiliary quantity that will produce a moment in opposite phase with the disturbing moment of the motor.

According to an embodiment of the invention, the saturation of the current regulator is compensated by feeding the third harmonic of the current into the current regulator.

For each elevator, the required phase shifts and amplitudes are determined e.g. experimentally.

Figure 1:
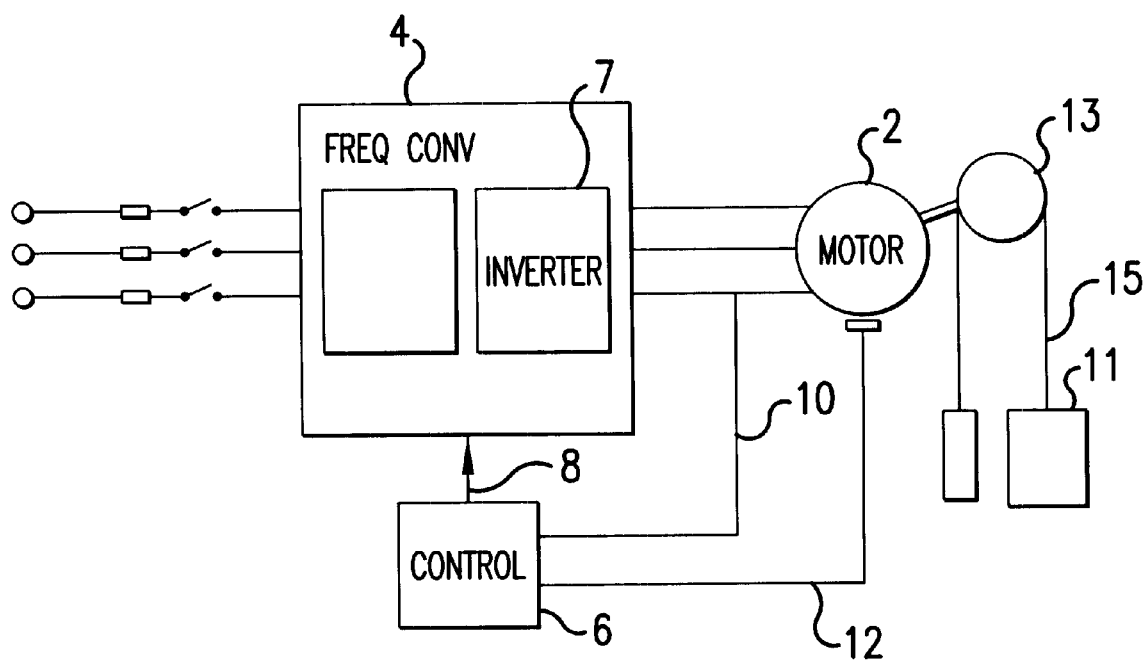
Figure 2:
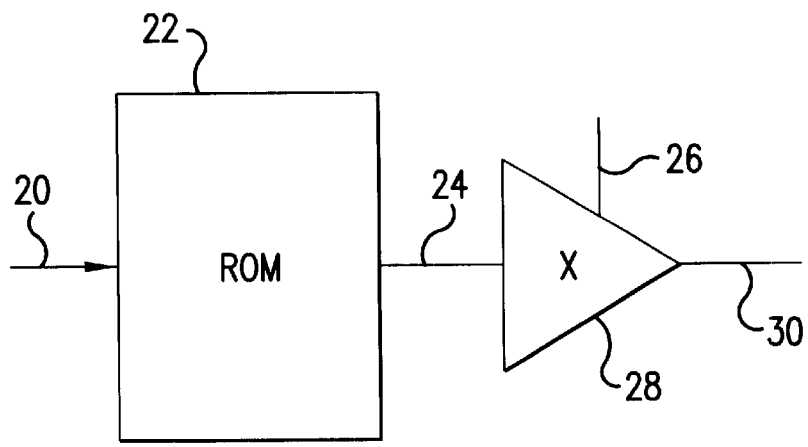
Figure 3:
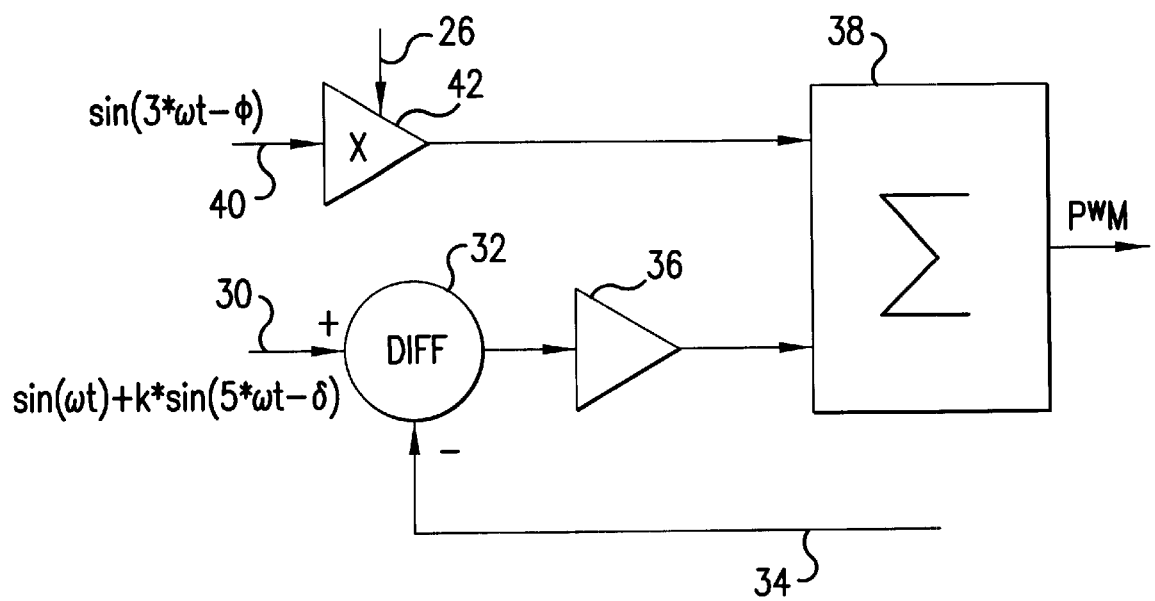

In the following, the invention will be described by the aid of an embodiment example with reference to the attached drawing, wherein FIG. 1 presents a diagram for motor control according to the invention, FIG. 2 illustrates the generation of a current reference, and FIG. 3 presents a circuit for the compensation of saturation of the current regulator.

FIG. 1 represents an embodiment for implementing motor control according to the invention, in which a permanent magnet synchronous motor 2 is fed via a frequency converter 4, The synchronous motor 2 is used to drive an elevator car 11 by means of a traction sheave 13 connected to its shaft and ropes 15 fitted on the traction sheave. The frequency converter 4 is controlled by a control unit 6, which generates control pulses to be applied via conductors 8 to the switches of the frequency converter 4. The feedback quantities are actual current value 10 and rotor position angle 12.

According to the invention, the regulation of the permanent magnet synchronous motor 2 is implemented using a current-controlled inverter 7. Rotor angle feedback in the motor is synchronized with the positions of the rotor magnets. This provides information regarding the position of the d-q coordinates of the motor. Current control is implemented using analogue techniques. The speed and torque controller is implemented using a microcontroller because of easier parameterisation. By applying three-phase vector control, complicated conversions from stator coordinates to rotor coordinates and vice versa are avoided.

In a permanent magnet synchronous motor, a disturbing moment corresponding to six times the motor supply frequency is generated. The current reference is formed from a table stored in memory 22 (ROM), where a current value corresponding to the angle 20 is read. Preferably the fifth and seventh harmonics are stored in the same table. The quantity 24 read from the table is multiplied by a torque reference 26 in a four-quadrant multiplier 28, whose output provides the current reference 30. Moreover, the $11^{th}$ and $13^{th}$ harmonics can be compensated in the same way. Other periodic disturbing moments can be compensated correspondingly.

When the fifth harmonic is used, the current reference 30 is of the form $I_{ref}=I*[\sin(\omega t)+k*\sin(5*\omega-\delta)]$ where a coefficient k and phase shift $\delta$ are used to determine the magnitude of the moment needed to eliminate the torque ripple. In a differential element 32, the actual value 34 of the phase current is subtracted from the current reference 30. The output of the differential element 32 is fed into an amplifier 36 and from there further into a summing element 38. The semiconductor switches of the inverter are controlled by pulse width modulation as determined by the output of the summing element 38.

To compensate the saturation of the current regulator, a signal 40 having a frequency three times the fundamental frequency of the current reference is generated. The signal 40 is of the form $I_{ref}=\sin(\omega t)-\phi$, where $\phi$ is a phase shift value specific to the individual drive. The signal 40 is formed in a corresponding manner by reading from a table as described above in conjunction with the determination of the current reference. The signal is multiplied by the torque reference 26 in a multiplier 42, whose output is applied to the summing element 38, where it is added to the quantity determined by the current reference.

The starting torque of the elevator must be adjusted to a value corresponding to the load so as to avoid producing a jerk in the car when the brake is released. This is normally implemented by measuring the load and adjusting the torque to a value corresponding to the load. In practice, however, due to inaccuracies in load measurement, jerks caused by sudden changes in acceleration do occur. This problem can be solved by measuring the rotor position with an accurate and fast position sensor, one of whose time derivatives provides acceleration data. Based on this, a correcting moment is generated to limit the acceleration. The correcting moment is combined with the preset starting torque used to control the motor. As the position sensor and acceleration data updates are obtained at intervals of the order of a few tens of milliseconds, jerks in the car movement can be limited to a magnitude below one millimetre, which will hardly be noticed by a passenger in the car.

The invention has been described above by the aid of some of its embodiments. However, the presentation is not to be regarded as constituting a limitation of the sphere of patent protection, but the embodiments of the invention may vary within the limits defined in the following claims.

What is claimed is:

1. Method for controlling a permanent magnet alternating-current motor fed from a current-controlled alternating-current source, in which method the effect of harmonic moments generated in the motor is compensated comprising the following steps:

regulating a torque of the motor by means of a current reference; and correcting the current reference to compensate for the harmonic moment by adding a harmonic of a supply frequency to the current reference.

2. Method as defined in claim 1, characterized in that a current reference component producing a moment equal in magnitude and opposite in phase to the harmonic moment is added to the current reference.

3. Method as defined in claim 1 or 2, characterized in that the fifth or seventh harmonic of the supply frequency is added to the current reference.

4. Method as defined in claim 1 or 2, characterized in that the eleventh or thirteenth harmonic of the supply frequency is added to the current reference.

5. Method as defined in claim 3, characterized in that the harmonic added to the supply frequency is shifted in phase relative to a harmonic of the fundamental wave.

6. Method as defined in claim 1, characterized in that the third harmonic is fed into the current regulator.

7. Method as defined in claim 6, characterized in that the third harmonic is applied to the output of the current regulator.

8. Method as defined in claim 5, characterized in that the third harmonic is shifted in phase relative to the third harmonic of the fundamental wave.

* * * * *